United States Patent
Narukawa

(10) Patent No.: US 8,264,749 B2
(45) Date of Patent: Sep. 11, 2012

(54) IMAGE READING APPARATUS AND IMAGE FORMING APPARATUS

(75) Inventor: Toshiki Narukawa, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1134 days.

(21) Appl. No.: 11/673,293

(22) Filed: Feb. 9, 2007

(65) Prior Publication Data

US 2007/0183007 A1 Aug. 9, 2007

(30) Foreign Application Priority Data

Feb. 9, 2006 (JP) ................................. 2006-031873

(51) Int. Cl.
- *H04N 1/04* (2006.01)
- *G03F 3/08* (2006.01)
- *G03G 15/00* (2006.01)
- *G03G 15/043* (2006.01)
- *G03G 15/04* (2006.01)
- *B41J 2/435* (2006.01)
- *B41J 2/47* (2006.01)

(52) U.S. Cl. ............ 358/475; 358/519; 399/47; 399/51; 399/220; 347/224; 347/225

(58) Field of Classification Search .................. 358/475, 358/519
See application file for complete search history.

(56) References Cited

U.S. PATENT DOCUMENTS

| | | | | |
|---|---|---|---|---|
| 5,523,861 A | * | 6/1996 | Tanaka et al. | 358/475 |
| 5,729,626 A | * | 3/1998 | Hada et al. | 382/170 |
| 6,104,509 A | * | 8/2000 | Yoshida | 358/509 |
| 6,173,134 B1 | * | 1/2001 | Nishimura et al. | 399/58 |
| 6,330,083 B1 | | 12/2001 | Nabeshima et al. | |
| 6,492,782 B2 | | 12/2002 | Ishizuka | |
| 6,657,748 B1 | * | 12/2003 | Okita et al. | 358/461 |
| 6,765,696 B1 | * | 7/2004 | Motominami et al. | 358/471 |
| 6,785,026 B1 | * | 8/2004 | Terajima et al. | 358/509 |
| 7,236,270 B2 | * | 6/2007 | Okamura | 358/406 |

(Continued)

FOREIGN PATENT DOCUMENTS

JP 04-101559 4/1992

(Continued)

OTHER PUBLICATIONS

Office Action received in corresponding Japanese Application No. 2006-031873, mailed Mar. 9, 2010.
Decision of Refusal for corresponding Japanese Patent Application 2006-031873 mailed on Aug. 3, 2010.

*Primary Examiner* — Hilina S Kassa
(74) *Attorney, Agent, or Firm* — Banner & Witcoff, Ltd.

(57) ABSTRACT

An image reading apparatus includes a light emitting unit which emits light to a document, a photoelectric conversion unit which converts a quantity of light reflected from the document into an analog signal, an A/D converter which converts the analog signal to a digital signal, a clock unit which clocks elapsed time from start-up of the light emitting unit, a light-quantity calculating unit which calculates the quantity of light emitted to the document from the light emitting unit on the basis of the clocked elapsed time, a correction value calculating unit which calculates a correction value of the digital signal on the basis of the quantity of light calculated by the light-quantity calculating unit and the digital signal, and a γ correction unit which corrects the digital signal by referring to the correction value calculated by the correction value calculating unit.

6 Claims, 17 Drawing Sheets

U.S. PATENT DOCUMENTS

| | | | | |
|---|---|---|---|---|
| 7,283,285 | B2 * | 10/2007 | Konno | 358/497 |
| 7,605,951 | B2 * | 10/2009 | Kagami | 358/447 |
| 7,911,654 | B2 * | 3/2011 | Cui et al. | 358/406 |
| 2004/0004742 | A1 * | 1/2004 | Ooshima et al. | 358/474 |
| 2004/0070797 | A1 * | 4/2004 | Moritaku | 358/474 |
| 2004/0160651 | A1 * | 8/2004 | Hakamada | 358/509 |
| 2004/0174568 | A1 * | 9/2004 | Murakami | 358/2.1 |
| 2005/0129438 | A1 * | 6/2005 | Sugimoto | 399/388 |
| 2005/0174611 | A1 * | 8/2005 | Konno | 358/474 |
| 2005/0190255 | A1 * | 9/2005 | Tsujino et al. | 347/224 |

FOREIGN PATENT DOCUMENTS

| | | |
|---|---|---|
| JP | 5-053399 | 3/1993 |
| JP | 09-163137 | 6/1997 |
| JP | 11-046289 | 2/1999 |
| JP | 11-075037 | 3/1999 |
| JP | 11-122441 | 4/1999 |
| JP | 2000-349989 | 12/2000 |
| JP | 2001-257841 | 9/2001 |
| JP | 2002-271591 | 9/2002 |

* cited by examiner

FIG. 11

| OUTPUT VALUE D (0-255) | 0 | 1 | 2 | ... | 4 | ... | 25 | ... | 100 | ... | 225 | ... | 253 | 254 | 255 |
|---|---|---|---|---|---|---|---|---|---|---|---|---|---|---|---|
| CORRECTION VALUE R (0-255) | 0 | 16 | 23 | ... | 32 | ... | 80 | ... | 160 | ... | 240 | ... | 254 | 254 | 255 |

$R = (D/255)^{1/\alpha} \times 255$ ($\gamma = 2$)

FIG. 14

| LIGHTING TIME t (SEC) | 0 | ... | 4 | ... | 7 | ... | 10 | ... | 18 | ... | 30 | ... | 38 | ... | 44 | ... | 53 | 54 | ... | 60 |
|---|---|---|---|---|---|---|---|---|---|---|---|---|---|---|---|---|---|---|---|---|
| OUTPUT LIGHT QUANTITY L (%) | 0 | ... | 20 | ... | 30 | ... | 40 | ... | 60 | ... | 80 | ... | 90 | ... | 95 | ... | 100 | 100 | ... | 100 |

FIG. 15

DRAFT COPY

[OK]   CANCEL

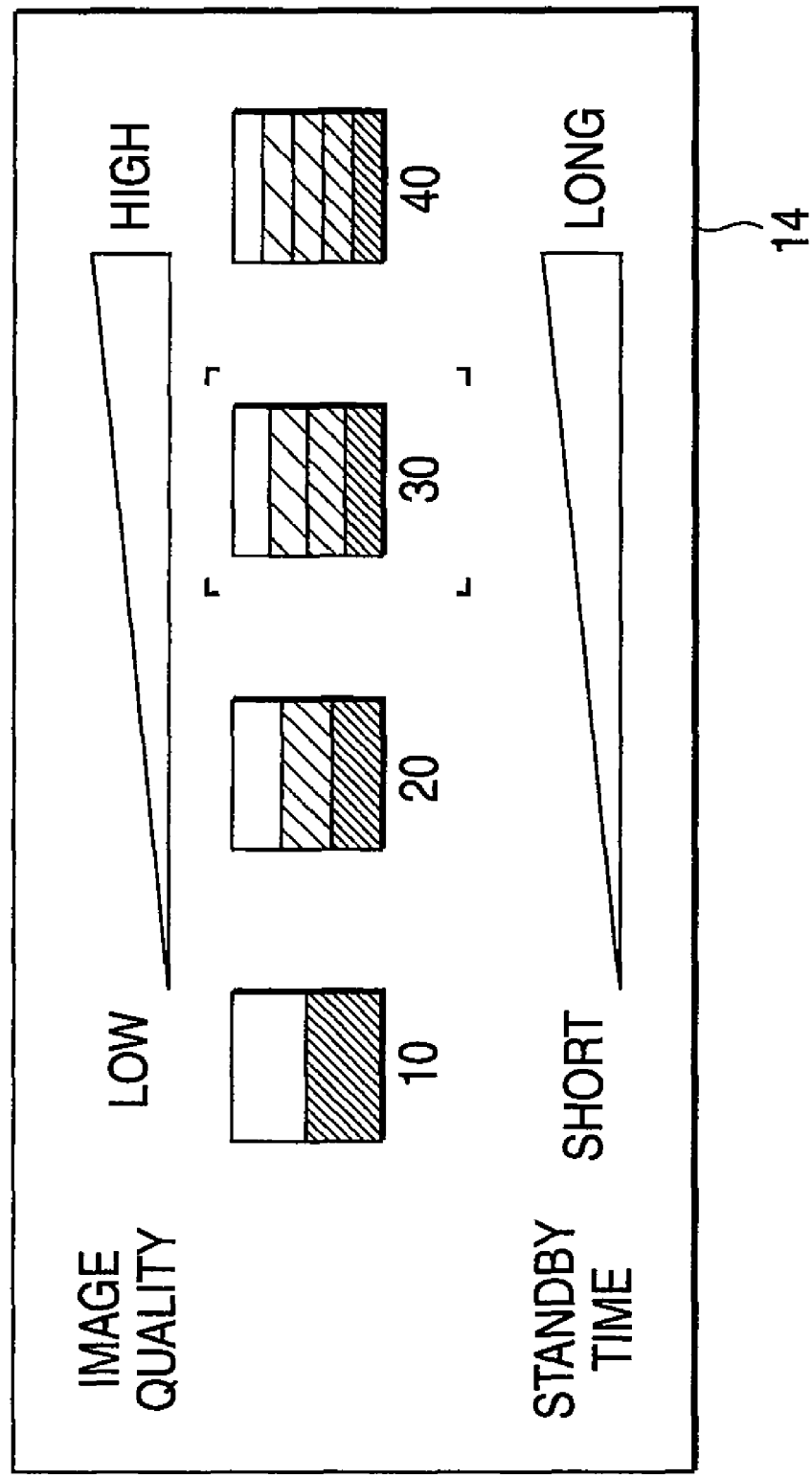

`US 8,264,749 B2`

IMAGE READING APPARATUS AND IMAGE FORMING APPARATUS

CROSS-REFERENCE TO RELATED APPLICATION

This application claims priority from Japanese Patent Application No. 2006-031873, filed on Feb. 9, 2006, the entire subject matter of which is incorporated herein by reference.

TECHNICAL FIELD

Aspects of the present invention relate to an image reading apparatus capable of reading images of documents and an image forming apparatus such as a laser printer which has the image reading apparatus.

BACKGROUND

In an image forming apparatus capable of emitting light to a document to read and copy an image from a quantity of light reflected from the document, an image forming apparatus is known that is capable of copying a high-quality image even in the case of a low quantity of light reflected from the document.

For example, JP-A-11-046289 discloses a configuration as follows: When the quantity of light from a fluorescent lamp emitting light to a document is stable after a device is switched on, the device starts to read the document and the quantity of light is corrected prior to reading a next document in order to absorb a reduced quantity of light on reading many documents by an automatic document feeder.

In the configuration of JP-A-11-046289, if the quantity of light from a fluorescent lamp is above a minimum age guarantee level, gain/shading correction is conducted to correct the variation in quantity of light. On the other hand, if the quantity of light from the fluorescent lamp is below the minimum image guarantee level, only the gain/shading correction will result in a deteriorated quality of images which have been read. Therefore, prior to the gain/shading correction, the quantity of light from the lamp itself is corrected to prevent the deteriorated quality of images.

In the configuration disclosed in JP-A-11-046289, immediately after the power source of the device is switched on, the quantity of light from a fluorescent lamp is only adjusted, and images of documents are not read before the quantity of light becomes stable. Thus, it is difficult to start reading images until the quantity of light from the fluorescent lamp becomes stable (maximum output), and a user has to wait until then.

BRIEF DESCRIPTION OF THE DRAWINGS

FIG. 11 is a γ correction table showing a corresponding relationship between an output value D outputted from the CCD image sensor (256 stages) and a correction value R when the output value D is corrected by a γ correction unit (256 stages);

FIG. 14 is a light-quantity correction table prepared by allowing an elapsed time t (sec) from start-up of the light source of the cold-cathode tube to correspond to an output light quantity L (%) of the cold-cathode tube;

FIG. 15 is a drawing showing a display screen of a liquid crystal display for setting a draft copy;

FIG. 16 is a flowchart showing reading processing for reading documents placed on a platen glass by the multi-function device immediately after the power supply is switched on; and FIG. 17 is a drawing in which an image quality at an ordinary copy in a minimum output light quantity and a standby time t1 which is allowed to correspond to the image quality are visually displayed in four stages on the liquid crystal display.

DETAILED DESCRIPTION

<General Overview>

According to an aspect of the invention, an image reading apparatus comprises: a light emitting unit which emits light to a document; a photoelectric conversion unit which converts a quantity of light reflected from the document into an analog signal; an A/D converter which converts the analog signal to a digital signal; a clock unit which clocks elapsed time from start-up of the light emitting unit; a light-quantity calculating unit which calculates the quantity of light emitted to the document from the light emitting unit on the basis of the clocked elapsed time; a correction value calculating unit which calculates a correction value of the digital signal on the basis of the quantity of light calculated by the light-quantity calculating unit and the digital signal; and a γ correction unit which corrects the digital signal by referring to the correction value calculated by the correction value calculating unit.

According to a second aspect of the invention, an image forming apparatus comprises: a light emitting unit which emits light to a document; a photoelectric conversion unit which converts a quantity of light reflected from the document into an analog signal; an A/D converter which converts the analog signal into a digital signal; a clock unit which clocks an elapsed time from start-up of the light emitting unit;

a light-quantity calculating unit which calculates the quantity of light emitted to the document from the light emitting unit on the basis of the clocked elapsed time; a correction value calculating unit which calculates a correction value of the digital signal on the basis of the light quantity calculated by the light-quantity calculating unit and the digital signal; a γ correction unit which corrects the digital signal by referring to the correction value calculated by the correction value calculating unit; and an image forming unit which forms an image on the basis of the corrected digital signal.

<Illustrative Aspects>

Figure 1:
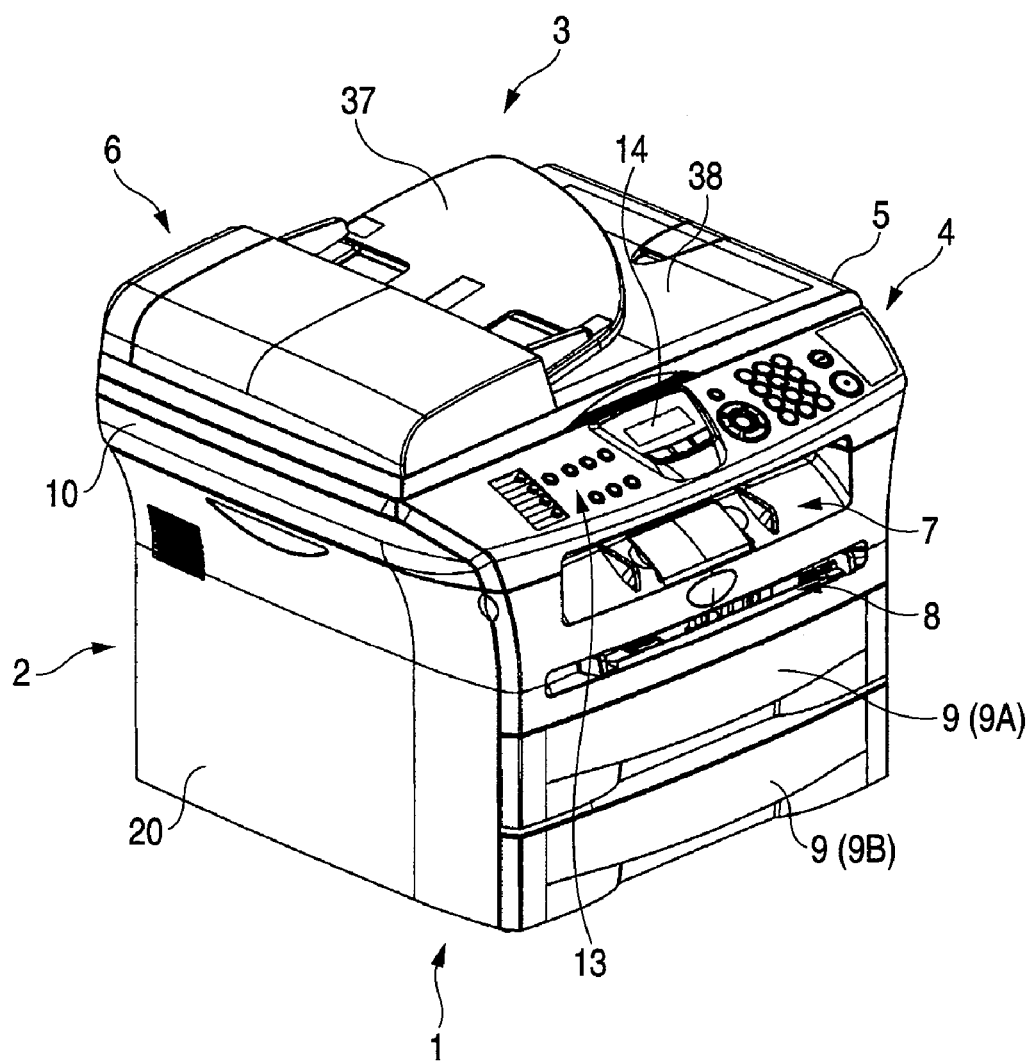
FIG. 1 is a perspective view of a multi-function device according to an aspect of the invention.
Figure 2:
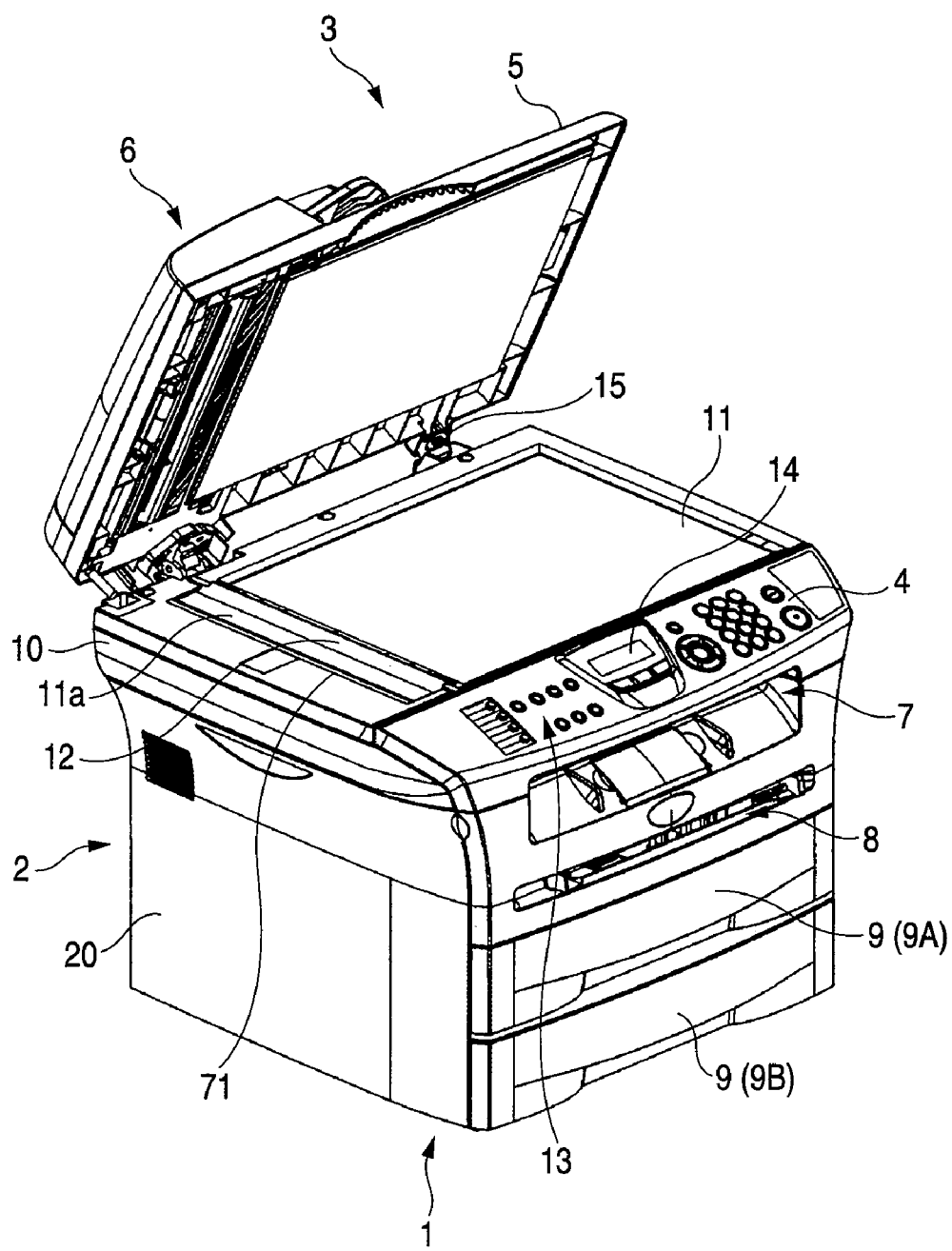
FIG. 2 is a perspective view of the multi-function device, in which a document reading device is kept opened.
Figure 3:
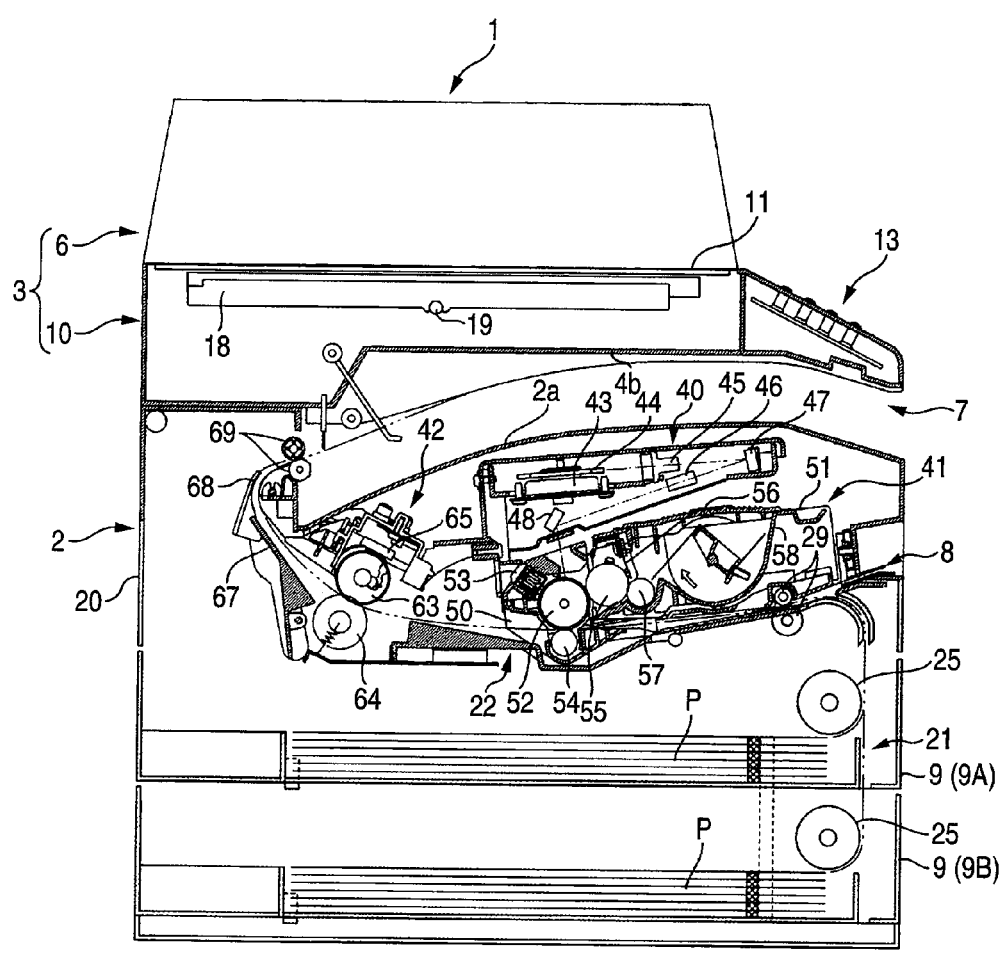
FIG. 3 is a sectional view showing the multifunction device when observed axially from a sheet feed roller.
Figure 4:
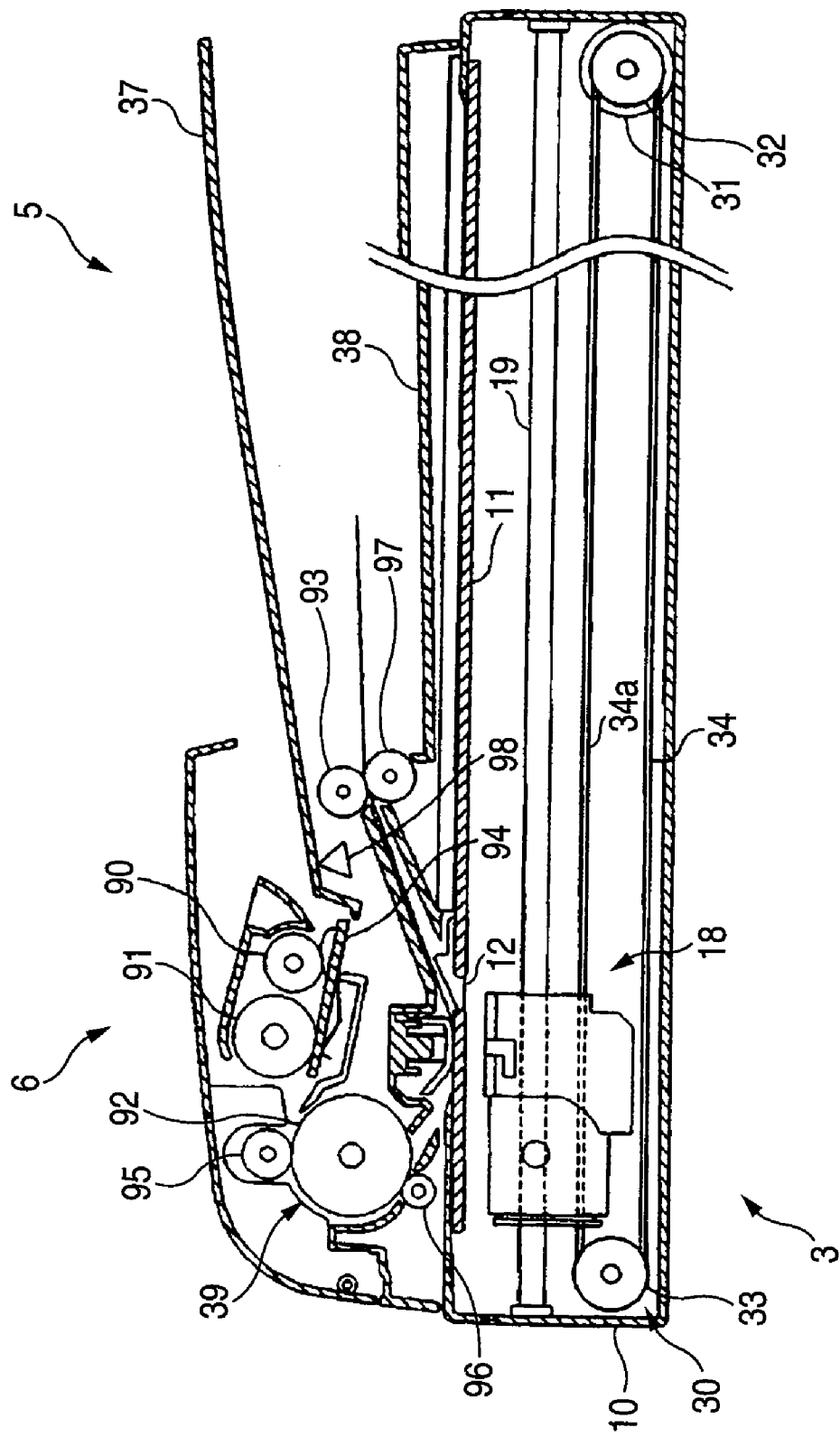
FIG. 4 is a pattern diagram showing a longitudinal sectional structure of the document reading device.
Figure 5:
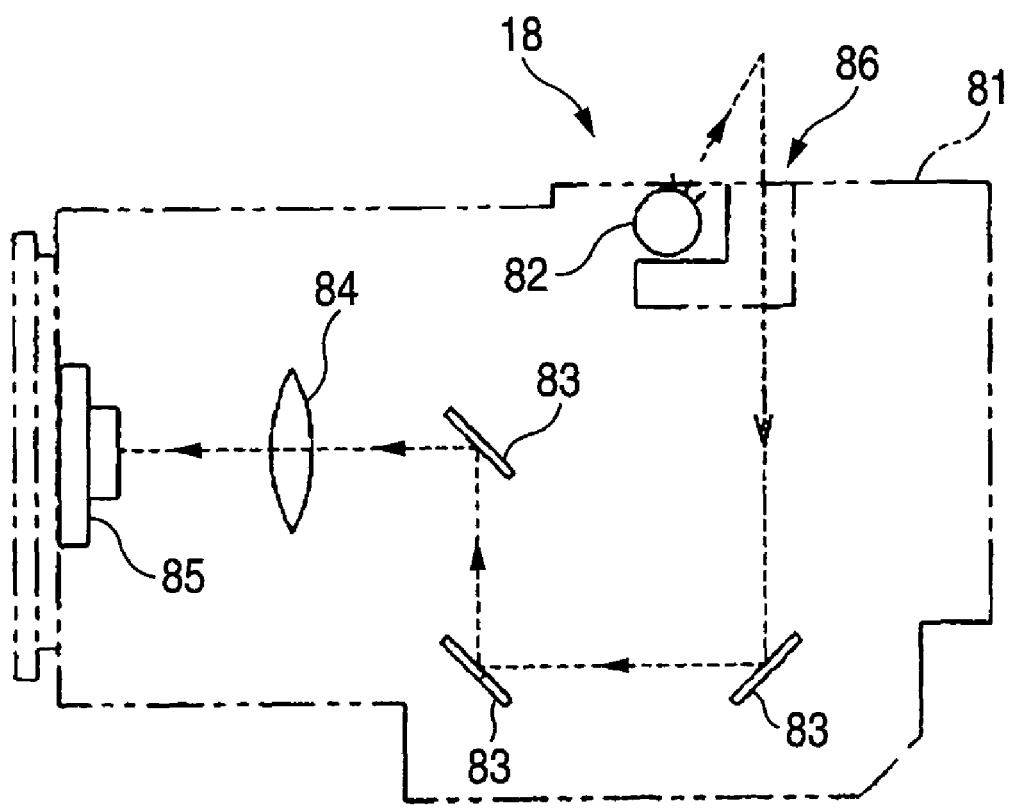
FIG. 5 is a pattern diagram briefly showing an inner structure of a CCD unit when observed from the direction shown in FIG. 4.

Hereinafter, with reference to FIG. 1 to FIG. 5, a description will be made for a structure of a multi-function device 1 (one example of an image forming apparatus) having functions to print, scan, copy, etc., according to an aspect of the present invention. FIG. 1 is a perspective view showing the image forming apparatus. FIG. 2 is a perspective view showing the multi-function device 1 in a state that a document reading device 3 is opened. FIG. 3 is a sectional view of major parts of the multi-function device 1 when observed axially from a sheet feed roller 25, etc. FIG. 4 is a pattern diagram showing a longitudinal sectional structure of the document reading device 3. FIG. 5 is a pattern diagram showing a brief inner structure of a CCD unit 18 when observed from the direction shown in FIG. 4. It is noted that the multi-function device 1 will be described on the assumption that a face on which an operation key 13 is provided (the lower right direction on the space of FIG. 1) is regarded as "front face" and an opposite face (the upper left direction on the space of FIG. 1) is regarded as "back face."

The multi-function device 1 has an image forming unit 2 (one example of an image forming unit) internally having a feeder unit 21, an image forming unit 22, etc. (refer to FIG. 3), and a document reading device 3 (one example of an image reading apparatus). As shown in FIG. 1 and FIG. 2, the document reading device 3 includes a reading device main body 10 on the upper face on which a rectangular platen glass 11 is mounted and an automatic document feeder (hereinafter, referred to as ADF 6) which is arranged so as to cover the platen glass 11.

As shown in FIG. 2, in the document reading device 3, the base end which is opposite the operation key 13 is pivotally and rotatably supported at the base end on the upper face of the image forming-unit 2. This will be described in detail later.

A sheet ejection hole 7, which is opened in continuation with a sheet discharge tray 2a (refer to FIG. 3), is formed below the operation key 13. A manual feed opening 8, which is opened in a slit form and extends in a horizontal direction, is formed below the sheet ejection hole 7. Two sheet feeding cassettes 9 (9A, 9B) are provided in two stages below the manual feed opening 8.

(Image Forming Unit)

A description will be made for individual structures of the image forming unit 2 by referring to FIG. 3. The right side on the space of this drawing is the front face of the multi-function device 1 and the left side on the space is the back face of the multi-function device 1.

A feeder unit 21 for feeding a sheet P and an image forming unit 22 for forming a predetermined image on the fed sheet P are provided inside a casing 20 of the image forming unit 2. The sheet discharge tray 2a is arranged above the image forming unit 22. The sheet discharge tray 2a is used for retaining the discharged sheet P on which an image is formed by the image forming unit 22.

The feeder unit 21 includes two sheet feed cassettes 9A, 9B, a sheet pressing plate (not shown), which is swingable and is provided inside each of the sheet feed cassettes 9 (9A, 9B), and a sheet feed roller 25 provided above the leading side end of each of the sheet feed cassettes 9, etc.

The feeding cassettes 9 (9A, 9B) are placed below inside the casing 20 and inserted into or removed from the face on the operation key 13 (in an attachable or detachable manner), into which a sheet P is layered and accommodated. The uppermost sheet P is sequentially fed by the sheet feed roller 25 via a conveying path to a resister roller 29.

The resister roller 29 includes a pair of rollers and controlled for the driving and halting actions by a controller (not shown) on the basis of the detecting timing by a position sensor (not shown) arranged in the vicinity of the sheet feed roller 25. Then, the feed angle of the sheet P is corrected by the control.

The image forming unit 22 has a scanner-unit 40, a processing unit 41 and a fixing unit 42, etc.

As shown in FIG. 3, the scanner unit 40 is placed above inside the casing 20. The scanner unit 40 has a laser emitting unit (not shown), a polygon mirror 44 rotated and driven by a polygon motor 43, lenses 45, 46 and reflecting mirrors 47, 48, etc. A laser beam which is emitted from the laser emitting unit on the basis of predetermined image data passes through or reflects from in the order of the polygon mirror 44, the lens 45, the reflecting mirror 47, the lens 46 and the reflecting mirror 48. Accordingly, the laser beam is emitted on the surface of a photosensitive drum 52 of the processing unit 41 (described later) at a rapid scanning.

The multi-function device 1 has the processing unit 41 attachable to or detachable from the image forming unit 2 main body.

The processing unit 41 includes a drum cartridge 50 and a developing cartridge 51.

The drum cartridge 50 has a photosensitive drum 52, a scorotron type charger 53 and a transfer roller 54. Further, the developing cartridge 51 has a developing roller 55, a thickness restricting blade 56 which is allowed to make a pressure contact with the developing roller 55, a toner supplying roller 57 and a toner box 58 into which toner is filled.

The photosensitive drum 52 is disposed on the side of the developing roller 55 so as to rotate in a clockwise direction opposing the developing roller 55.

The scorotron type charger 53 is a positively charged scorotron type charger and disposed at a predetermined interval so as not to be in contact with the photosensitive drum 52.

The surface of the photosensitive drum 52 is uniformly subjected to positive charge at first by the scorotron type charger 53 in association with rotation of the photosensitive drum 52 and exposed to a laser beam from the scanner unit 40 at a rapid scanning. Accordingly, electrostatic latent images are formed on the basis of predetermined image data.

When the toner, which is positively charged and is held on the developing roller 55 with the rotation of the developing roller 55, is in contact with the opposing photosensitive drum 52, the toner is fed to the electrostatic latent images formed on the surface of the photosensitive drum 52.

The transfer roller 54 is disposed so as to oppose the photosensitive drum 52 below the photosensitive drum 52 and supported to the drum cartridge 50 so as to rotate in a counter-clockwise direction. Then, visible images held on the surface of the photosensitive drum 52 are transferred to the sheet P while the sheet P passes between the photosensitive drum 52 and the transfer roller 54.

The fixing unit 42 is disposed further downstream (to the back face) in the sheet feed direction than the processing unit 41. The fixing unit 42 has a heating roller 63 for heating and melting toner on the transferred sheet P, a pressing roller 64 disposed opposing the heating roller 63 and pressing the fed sheet P toward the heating roller 63 and a thermostat 65.

The heating roller 63 has a metal pipe made as a cylindrical member, and a halogen lamp is internally packed along the axis thereof. The halogen lamp is capable of heating the surface of the heating roller 63 at fixing temperatures (for example, 200° C.) at which the toner can be fixed on the sheet P.

The pressing roller 64 has a metal roller shaft and a rubber roller made with rubber for covering around the pressing roller shaft. The rubber roller of the pressing roller is elastically pressed to the metal pipe of the heating roller 63 and moved in association with the rotation of the heating roller 63.

The thermostat 65 is made, for example, with a bimetal and controls temperatures on the heating roller 63. Alternatively, it may be made with a temperature-detecting thermistor, thereby the halogen lamp can be switched on or off.

In the fixing unit 42, the heating roller 63 fixes the transferred toner on sheet P at the processing unit 41 by applying heat and pressure thereto, while the sheet P passes between the heating roller 63 and the pressing roller 64.

Further, the heating roller 63 conveys to a discharge roller 69 the sheet P on which images have been fixed via a sheet discharging path formed by guide members 67, 68. The discharge roller 69 discharges the fed sheet P on the sheet discharge tray 2a.

(Document Reading Device)

As shown in FIG. 1 and FIG. 2, the document reading device 3 is constituted as a flat bed scanner (hereinafter, referred to as FBS). The document reading device 3 is substantially provided with a reading device main body 10, a document cover 5 attached so as to be opened and closed via a hinge 15 on the back face of the reading device main body 10 and an operation panel 4 arranged in front of the upper face of the reading device main body 10.

The operation panel 4 includes various types of operation keys 13 (one example of an activation time reading setting unit and a standby time setting unit) and a liquid crystal display (LCD) 14 (one example of an activation time reading setting unit and a standby time setting unit). The operation keys 13 include a start button for inputting instructions to start reading, a stop button for discontinuing the reading, a numeric keypad and an arrow key, etc, for example. The liquid crystal display 14 displays various setting items for performing functions to fax, scan and copy or displays a screen for setting a draft copy to be described later. The content displayed on the liquid crystal display 14 is changed or determined by the operation keys 13. In the document reading device 3, a predetermined process is carried out by a CPU 101 to be described later in accordance with various instructions inputted by the operation panel 4.

As shown in FIG. 2, a platen glass 11 arranged so as to be exposed outside and a positioning member 12 are disposed on the upper face of the reading device main body 10. The document cover 5 is opened with respect to the reading device main body 10, by which the platen glass 11 is exposed. If the document cover 5 is closed, an entire upper face of the reading device main body 10 including the platen glass 11 is covered. As shown in FIG. 1, in a state that the document cover 5 is closed, that is, the platen glass 11 is covered with the document cover 5, the document cover 5 constitutes a part of the upper exterior of the document reading device 3.

The platen glass 11 is to place a document (not shown), the images of which are read when the document reading device 3 functions as an FBS, and composed of a colorless transparent glass plate, for example. A CCD unit 18 (one example of an image reading unit, refer to FIG. 4 and FIG. 5) for scanning mainly in the far direction of the document reading device 3 is provided below the platen glass 11 so as to move in a direction orthogonal to the far direction of the document reading device 3 (secondary scanning direction). The CCD unit 18 moves to the secondary scanning direction with respect to the document on the platen glass 11 and performs scanning while being exposed to light. Accordingly, images of the document are read.

As shown in FIG. 2, the platen glass 11a is provided at the left end, when observed from the front face of the reading device main body 10. The platen glass 11a constitutes a document reading face in reading images of a document while the document (not shown) is fed to the scanning direction by an ADF 6 mounted on the document cover 5. The platen glass 11a is composed of a transparent glass plate, for example. The platen glass 11a is extended to the far direction of the document reading device 3, corresponding to the length of a main scanning direction of the CCD unit 18. When the ADF 6 is used to read images of a document, the CCD unit 18 is vertically moved below the platen glass 11a and kept stationary at that position in order to perform image reading.

A positioning member 12 is installed between the platen glass 11 and the platen glass 11a. As with the platen glass 11a, the positioning member 12 is a long flat member extended in the far direction of the document reading device 3. The positioning member 12 is used as a positioning reference of documents in placing the documents on the platen glass 11 as a document placing face. Therefore, marks indicating a central position and both-end positions of various document sizes such as A4 and B5 are given on the upper face of the positioning member 12. A guide face for scooping up documents passing over the platen glass 11a from the ADF 6 and returning them to the ADF 6 is formed on the upper face of the positioning member 12 (refer to FIG. 4).

A white reference plate 71 for shading correction (described later) is extended in a scanning direction outside a document reading range on the edge of the platen glass 11a. The white reference plate 71 is formed in such a way that brightness on the surface can be made equal at any part. When the CCD unit 18 emits light to the white reference plate 71, the shading correction is performed on the basis of light reflected from the white reference plate 71.

As shown in FIG. 4, a guide shaft 19 is constructed inside a reading device main body 10 in the width direction of the reading device main body 10, that is, along a lateral direction on the space of FIG. 4. The guide shaft 19 is constructed parallel to the platen glass 11. The guide shaft 19 penetrates the interior of the CCD unit 18. The CCD unit 18 is supported via a bush (not shown) to the guide shaft 19 so as to slide. Accordingly, the CCD unit 18 is able to slide and move along the guide shaft 19 in the secondary scanning direction.

The CCD unit 18 is a reading device which emits light to a document and converts light reflected from the document into an electric signal (analog signal) to read images. As shown in FIG. 4 and FIG. 5, an substantially rectangular parallelepiped cabinet 81, a cold-cathode tube 82 (one example of a light emitting unit), a reflecting mirror 83, a condenser lens 84 and a CCD image sensor 85 (one example of a photoelectric conversion unit) are integrally provided with the CCD unit 18.

As shown in FIG. 5, the cold-cathode tube 82 is provided along the far direction of the document reading device 3 (the direction perpendicular to the space of FIG. 5) on the upper face of the cabinet 81. The cold-cathode tube 82 is a low-pressure mercury lamp in which a fluorescent material is coated inside a glass tube (glass bulb). When a high voltage is applied to electrodes of the cold-cathode tube 82, electrons inside the glass tube are allowed to move at a high velocity. Accordingly, the cold-cathode tube 82 emits light.

As shown in FIG. 5, a reflecting mirror 83, a condenser lens 84 and a CCD image sensor 85 are disposed inside the cabinet 81. Openings 86 are provided along the cold-cathode tube 82 in the cabinet 81, so that light, which is emitted from the cold-cathode tube 82 to a document and then reflected from the document, can intrude from the openings 86 into the cabinet 81. FIG. 5 shows a light path of the reflected light in dotted lines. The reflected light which has intruded into the cabinet 81 is sequentially reflected by the reflecting mirrors 83 arranged as appropriate and guided into the condenser lens 84. Such arrangement of the reflecting mirrors 83 is made as appropriate, with consideration given to a light path length necessary for imaging the reflected light on the CCD image sensor 85. The reflected light guided to the condenser lens 84 is imaged on the CCD image sensor 85 and converted into an analog electric signal by the CCD image sensor 85. The converted electric signal is subjected to a predetermined image processing by an image processing unit 108 (described later, refer to FIG. 6 and FIG. 7) and converted into image data. The image data is stored in a RAM 103 (described later).

As shown in FIG. 4, a belt driving mechanism 30 for driving a CCD unit 18 to slide and move the CCD unit 18 is disposed inside the reading device main body 10. The belt driving mechanism 30 includes a DC motor 31 arranged at one end of the reading device main body 10 in the secondary scanning direction, with the motor shaft set in the far direction of the device (the direction perpendicular to the space of FIG. 4), a pulley 32 attached to the motor shaft, a pulley 33 arranged at one end of the reading device main body 10 in the secondary scanning direction and on the side opposite the position of the DC motor 31 and an endless belt 34 suspended between these pulleys 32, 33. An upper belt 34a on the endless belt 34 penetrates the interior of the CCD unit 18 and the upper belt 34a is gripped by a grip unit (not shown) inside the CCD unit 18. Therefore, when the DC motor 31 is driven and the endless belt 34 is moved toward one side, the CCD unit 18 is also moved along the guide shaft 19 to the moving direction. The CCD unit 18 is capable of moving in a reciprocating manner to the secondary scanning direction by controlling the rotating direction of the DC motor 31.

As shown in FIG. 1 and FIG. 4, the ADF 6 is mounted on the document cover 5. The ADF 6 has a document tray 37 for placing a document with its face to be read kept upward, a document discharging tray 38 which is arranged below the document tray 37 and placing the document with its face to be read kept downward after completion of reading, and a conveying path 39 formed in a substantially U-turn shape between the document tray 37 and the document discharging tray 38.

A conveying unit for feeding documents is disposed on the conveying path 39. As shown in FIG. 4, the conveying unit includes a suction roller 90, a separation roller 91, a conveying roller 92, a sheet discharge roller 93, a suction guide 94 making a pressure contact with the suction roller 90 and the separation roller 91, pinch rollers 95, 96 making a pressure contact with the conveying roller 92, and a pinch roller 97 making a pressure contact with the sheet discharge roller.

The document tray 37 has an optical document sensor 98 on the face where a document is placed. The document sensor 98 detects whether or not the documents have been placed on the document tray 37. For example, the document sensor 98 includes a reflective-type photo interrupter in which a light emitting unit such as an LED and a light receiving unit such as a photo transistor are integrally assembled.

Documents placed on the document tray 37 are put out by the suction roller 90 and separated into single sheets by the separation roller 91. Then, the separated sheets are fed downstream on a conveying path 39. The documents fed to the conveying path 39 are further fed to a platen glass 11a as an image reading area at the lowest position (refer to FIG. 2) by the conveying roller 92 arranged further downstream than the separation roller 91. Then, the fed documents are sequentially read by a CCD unit 18 held below the platen glass 11a. The read documents are discharged to the document discharging tray 38 with its face read by the sheet discharge roller 93 kept downward.

(Control Unit)

Figure 6:
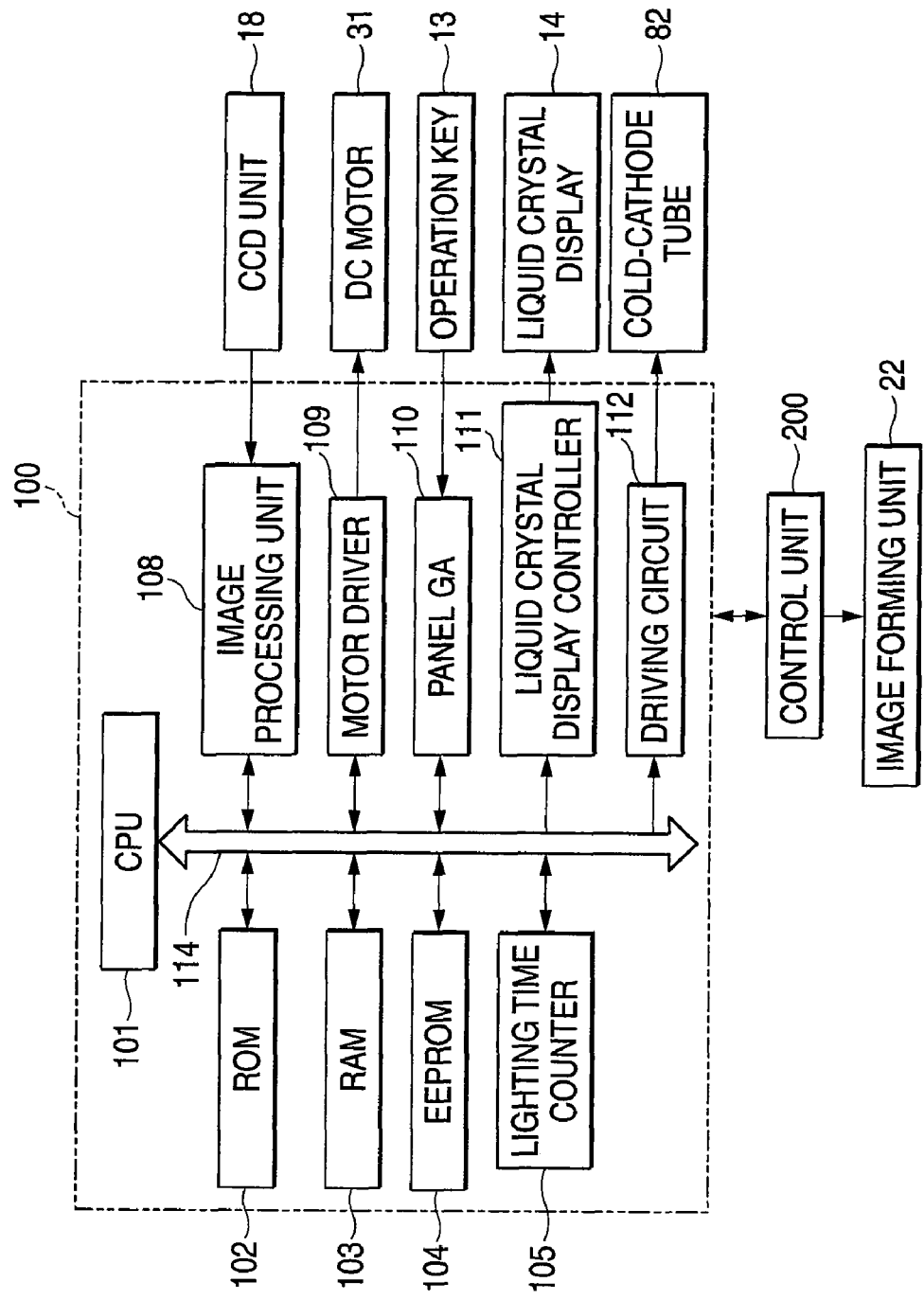
FIG. 6 is a block diagram showing a control unit which controls actions of the document reading device.
Figure 7:
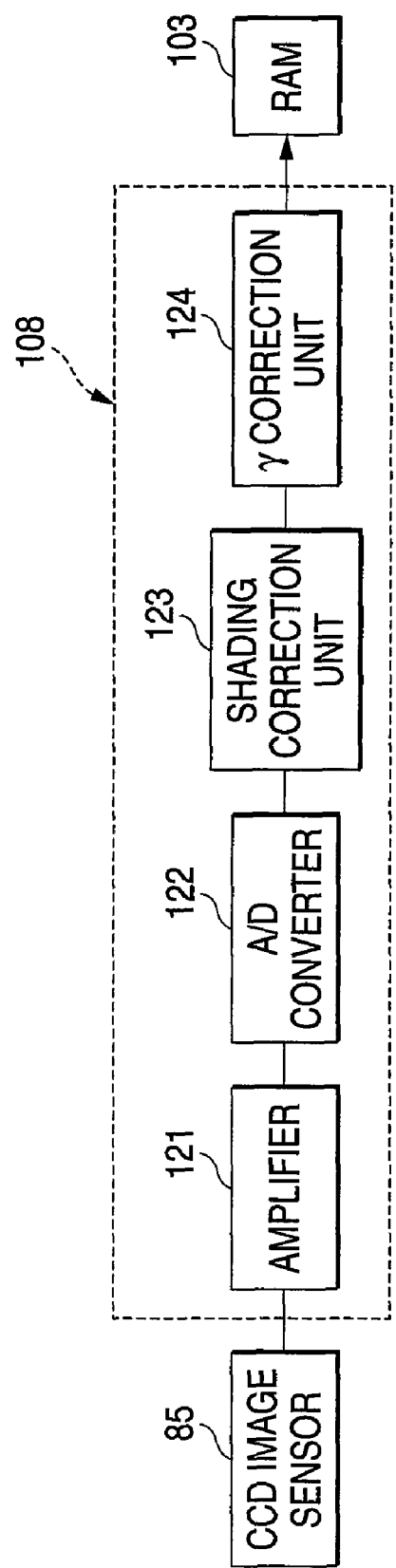
FIG. 7 is a block diagram showing an image processing unit for giving a predetermined image processing to an electric signal converted by a CCD image sensor to convert into image data.

With reference to FIG. 6 and FIG. 7 (block diagrams), a description will be made for a control unit 100 for controlling actions of the document reading device 3. FIG. 6 shows a block diagram on the control unit 100 for controlling actions of the document reading device 3. FIG. 7 shows a block diagram on an image processing unit 108 for giving a predetermined image processing to an electric signal converted by a CCD image sensor 85 and converting the signal into image data. The control unit 100 includes control devices such as a CPU 101 (one example of a light-quantity calculating unit, a correction value calculating unit or a γ correction unit), a ROM 102, a RAM 103, a EEPROM 104, a lighting time counter 105 (one example of a clock unit), an image processing unit 108, a motor driver 109, a panel gate array (panel GA) 110 and a liquid crystal display controller 111 and a driving circuit 112, each of which is electrically connected via a bus 114. Further, the control unit 100 is electrically connected to a control unit 200 which controls actions of the image forming unit 22 and sends images read from a document by the document reading device 3. The bus 114 includes an address bus, a data bus and a control signal line.

Figure 13:
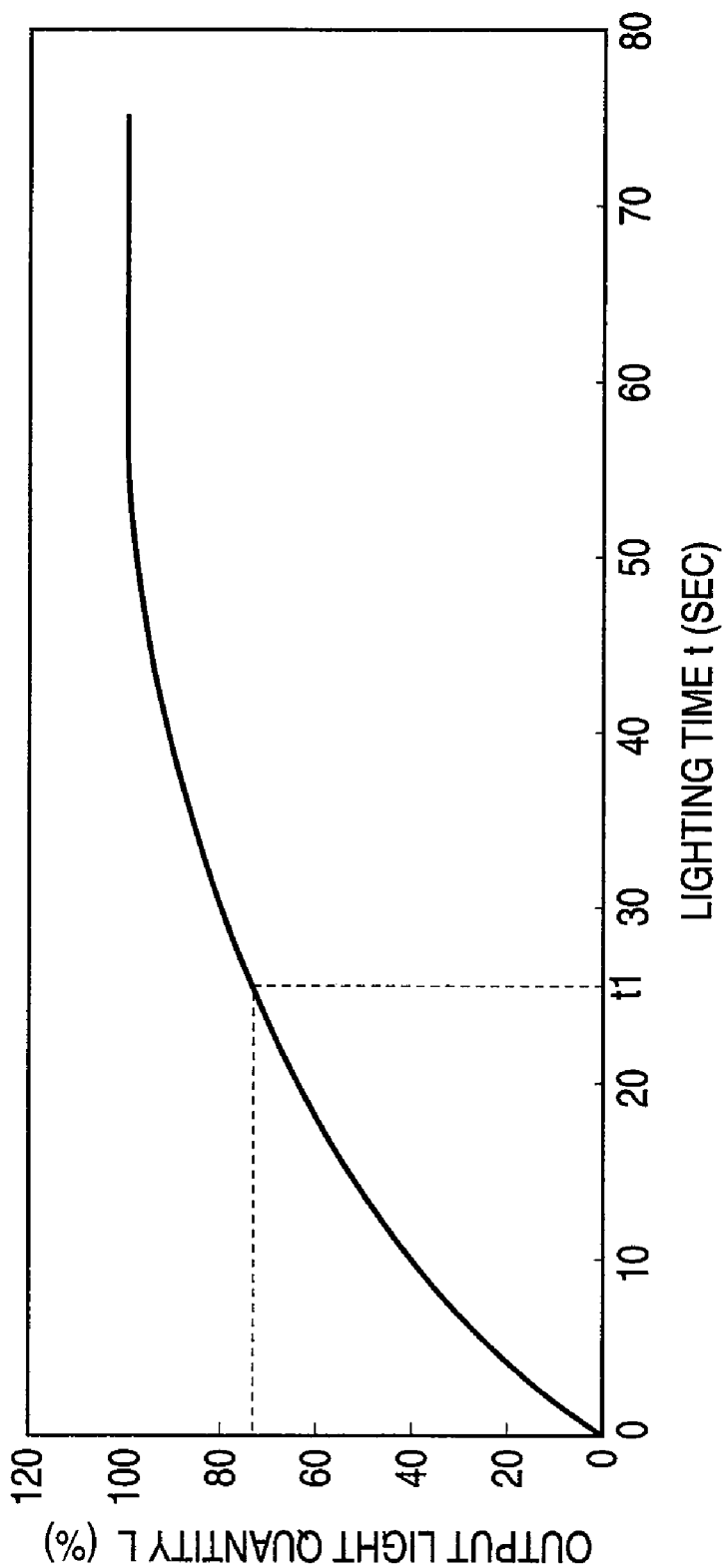
FIG. 13 is a graph showing the relationship between an elapsed time t (sec) from start-up of a light source of the cold-cathode tube and an output light quantity L (%) of the cold-cathode tube.

The ROM 102 stores a γ correction table (described later) as shown in FIG. 11 (one example of a correction value calculating unit), a light-quantity correction table and programs for controlling various actions of the document reading device 3, etc. The light-quantity correction table shown in FIG. 14 is tabulated by allowing an elapsed time t (sec) from start-up of a light source of a cold-cathode tube 82 as shown in FIG. 13 to correspond to an output light quantity L of the cold-cathode tube 82 (one example of a light-quantity calculating unit). The RAM 103 is used as a storage area or a working area of the CPU 101 for temporarily storing various data used when the CPU 101 executes the above programs and image data read by the CCD unit 18.

The CPU 101 controls control devices including the control unit 100 and devices to be controlled such as those controlled by the control unit 100 in a compressive manner. A general resistor integrally assembled into the CPU 101 stores various types of set values such as a counter setting value which is counted by the lighting time counter 105. In this aspect, data and programs stored into the ROM 102, the RAM 103 and the EEPROM 104 are read out by the CPU 101 to perform an arithmetic processing according to the above programs, by which documents are read by the multi-function device 1 immediately after the power supply of the device is switched on in accordance with the procedures shown in the flowchart of FIG. 16 (described later).

The image processing unit 108 is to give various types of image processing to an electric signal indicating an image of a document read out and outputted by the CCD unit 18, and the correction processing such as shading correction or γ (gamma) correction is carried out at the image processing unit 108. Image data subjected to various types of image processing is sent by the CPU 101 to the RAM 103 and stored temporarily at the RAM 103. Then, the image data stored in the RAM 103 is sent out to the control unit 200 and printed (copied) on the sheet by the image forming unit 22.

<Structure of Image Processing Unit>

Figure 8:
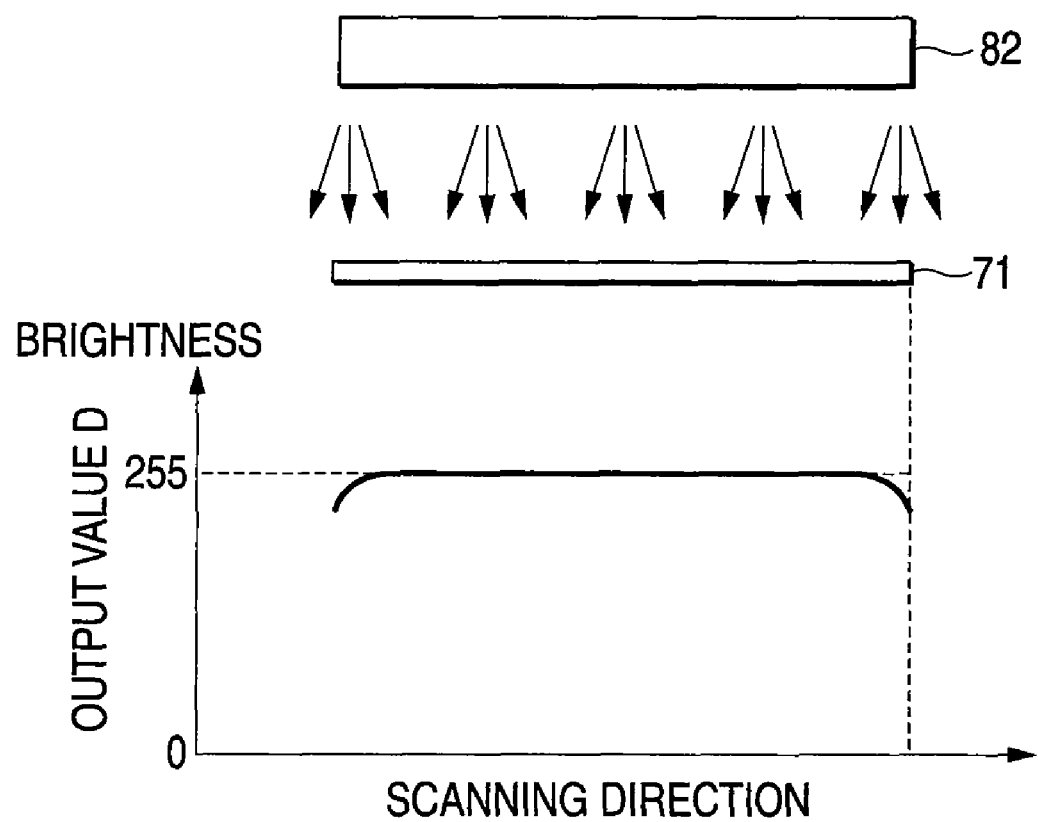
FIG. 8 is a drawing showing an optical distortion in a document scanning direction of light quantity of light emitted from a cold-cathode tube to documents.
Figure 9:
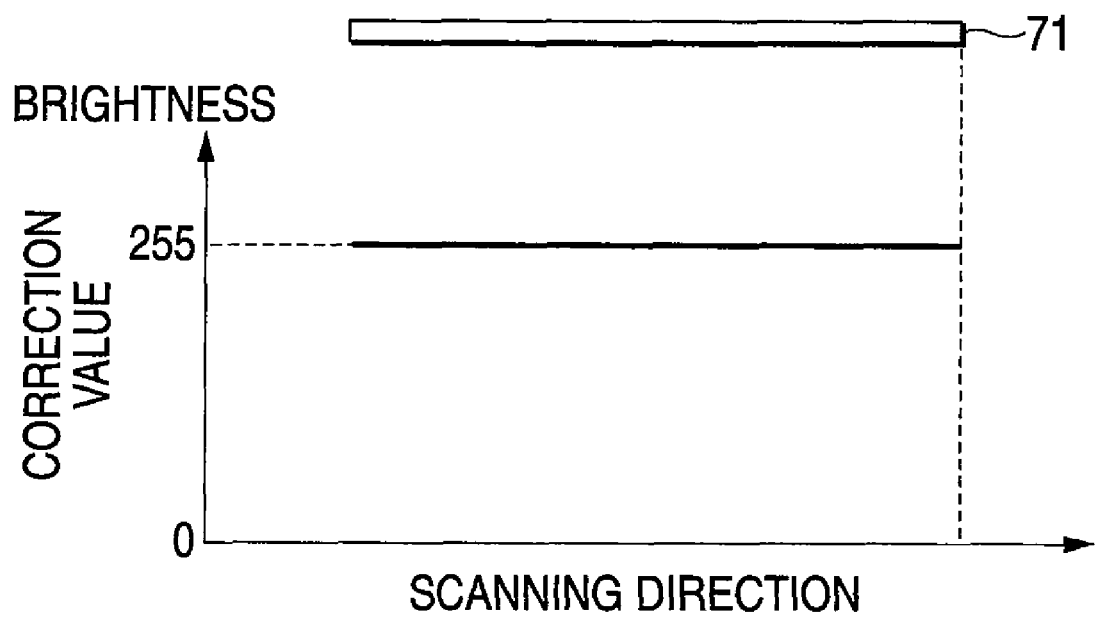
FIG. 9 is a graph showing the relationship of a value after correction when an electric signal outputted from the CCD image sensor is subjected to shading correction (256 stages) with a scanning direction of a white reference plate.
Figure 10:
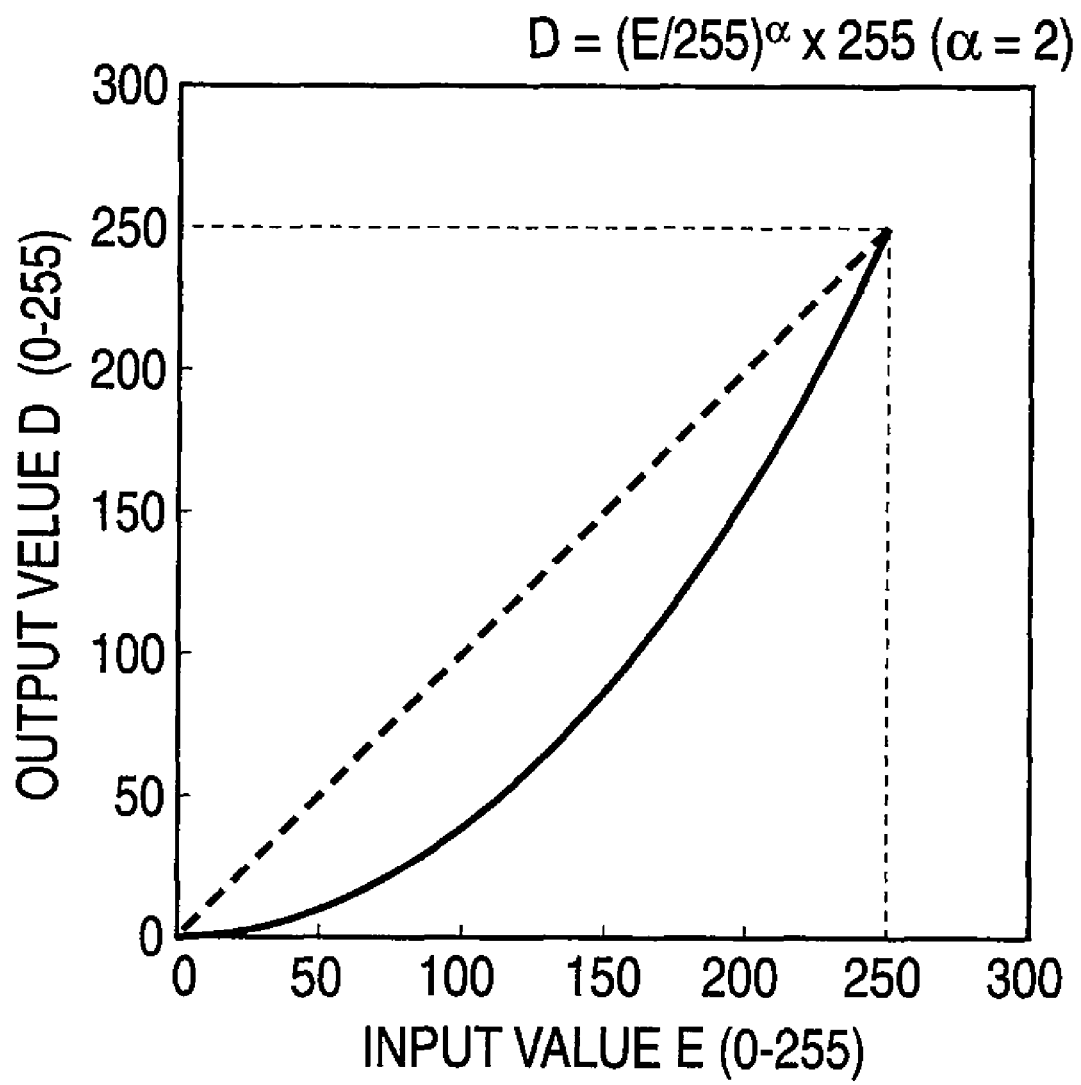
FIG. 10 is a graph showing the relationship between an input value E of reflected light from documents inputted into the CCD image sensor (256 stages) and an output value D outputted from the CCD image sensor (256 stages)
Figure 12:
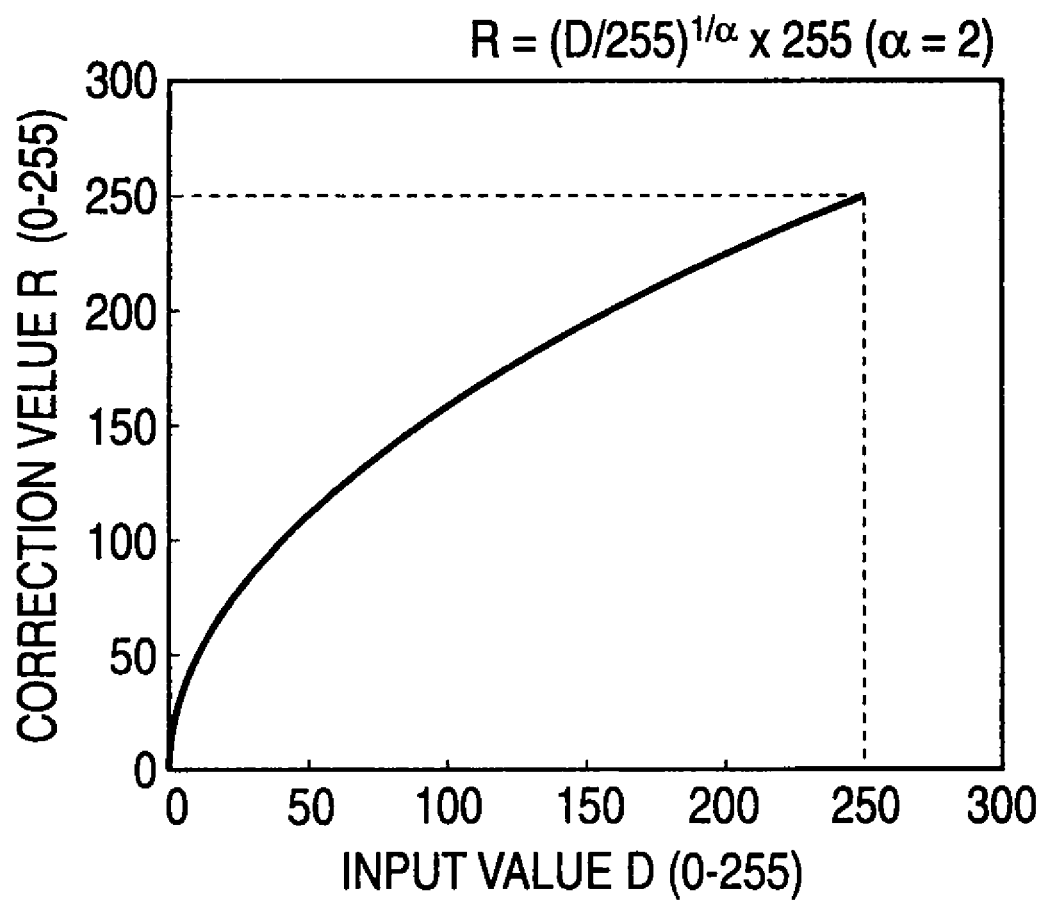
FIG. 12 is a graph showing the corresponding relationship of the γ correction table.

A description will be made for a detailed structure of the image processing unit 108 which gives the correction processing to image data read by the CCD unit 18 by referring to FIG. 7 to FIG. 12. FIG. 8 shows an optical distortion in the document scanning direction of light quantity of light emitted from a cold-cathode tube 82 to a document. FIG. 9 is a graph showing the relationship of a value after correction (256 stage) when an electric signal outputted from the CCD image sensor 85 is subjected to the shading correction with respect to the scanning direction of a white reference plate 71. FIG. 10 is a graph showing the relationship of an input value E of reflected light from the document to be inputted into the CCD image sensor 85 (256 stage) with the output value D to be outputted from the CCD image sensor 85 (256 stage). FIG. 11 is the γ correction table showing the relationship of an output value D outputted from the CCD image sensor 85 (256 stage) with a correction value R when the output value D is corrected by a γ correction unit 124 (256 stage). FIG. 12 is a graph showing a corresponding relationship with the γ correction table. FIG. 13 is a graph showing the relationship of an elapsed time t (sec) from start-up of a light source of the cold-cathode tube 82 with an output light quantity L of the cold-cathode tube 82 (%). FIG. 14 is a light-quantity correction table prepared by allowing the elapsed time t (sec) from start-up of the light source of the cold-cathode tube 82 to correspond to the output light quantity L of the cold-cathode tube 82 (%).

An amplifier 121 amplifies an image signal, which is read from a document by the CCD unit 18 and outputted from the CCD image sensor 85 as an analog signal, to a certain level.

An A/D converter 122 (one example of an A/D converter) converts an image signal amplified by the amplifier 121 into an image signal as an 8 bit-digital signal (256 stage).

A shading correction unit 123 corrects an optical distortion of the cold-cathode tube 82 (refer to FIG. 5). As shown in FIG. 8, the optical distortion is a phenomenon where, for example, when light emitted from the cold-cathode tube 82 and reflected to a white reference plate 71 is inputted into a CCD image sensor 85 and outputted from the CCD image sensor 85, an output value D on both ends of the scanning direction is made smaller than an output value at the center of the scanning direction. This is because light emitted from the cold-cathode tube 82 tends to diffuse and a part of the light emitted from both ends of the cold-cathode tube 82 in the secondary scanning direction is not emitted to the white reference plate 71. Therefore, when an electric signal read by the CCD unit 18 is sent out to an image forming-unit 22 without any shading correction at a shading correction unit 123, images formed on a sheet P by the image forming-unit 22 on both ends of the scanning direction are lower in brightness than those of documents used for reading on both ends of the scanning direction. Then, the shading correction unit 123 corrects an output value D from the CCD unit 18 on the basis of a signal on brightness of the white reference plate 71 stored into the RAM 103 read by the CCD unit 18 in order to make the correction values in the scanning direction substantially constant (refer to FIG. 9).

A γ correction unit 124 (one example of a γ correction unit) corrects a deviation of the contrast of images of a document due to characteristics (such as design value) of various constituents making up the CCD image sensor 85 from the contrast of images formed by reading images of the document. When the contrast of images of the document is accurately reproduced on images formed by reading images of the document, an ideal relationship between an input value E of reflected light from the document inputted into the CCD image sensor 85 and an output value D outputted from the CCD unit 18 to the image processing unit 108 is to give the relationship of 1:1 (D=E), as shown by dotted lines in FIG. 10. However, as shown by solid lines in FIG. 10, the relationship is in reality given as D=(E/255)$^\alpha$×255 (α>0) and not linear. Therefore, when the output value D is not subjected to the γ correction but sent out, as it is, to an image forming unit 22, images formed on a sheet by the image forming unit 22 are in general lower in brightness than images of the document used for reading. Therefore, as shown in FIG. 11, the γ correction unit 124 corrects an output value D from the CCD unit 18 with a correction value R on the basis of the γ correction table stored into the ROM 102 (refer to FIG. 12) in order to bring the relationship between the input value E and the output value D closer to 1:1 (refer to the dotted line in FIG. 10).

Incidentally, if an output light quantity of the cold-cathode tube 82 in the CCD unit 18 is maximum (100%), a relational expression of the output value D with the correction value R is expressed by the function of Formula 1. The γ correction table stored into the ROM 102 (refer to FIG. 11) is a table prepared on the basis of the function of Formula 1 where the output value D is an 8-bit signal (256 stage) and where α value is 2.0. In this instance, α value is a value which is different depending on whether the read images are corrected in a bright manner or in a dark manner. If the relationship of α=1 is obtained, the relationship of R=D is obtained on the basis of the function of Formula 1. Therefore, the relationship between the input value E and the output value D is 1:1, the necessity of correcting the output value D is eliminated. If the relationship of α>1 is obtained, the output value D is corrected on the basis of the function of Formula 1 in order to make the read images bright. If the relationship of α<1 is obtained, the output value D is corrected on the basis of the function of Formula 1 in order to make the read images dark. In this aspect, the relationship is given to be α=2.0. However, a value may be changed as appropriate.

$$R = (D/255)^{1/\alpha} \times 255 \quad \text{[Formula 1]}$$

Further, as shown in FIG. 13, if an elapsed time (lighting time) t from start-up of the light source of the cold-cathode tube 82 is short (for example, t=t1) and an output light quantity L of the cold-cathode tube 82 in the CCD unit 18 is not 100%, input value E of light reflected from a document inputted into the CCD unit 18 is decreased. Accordingly, output value D outputted from the CCD unit 18 to the image processing unit 108 is changed. Therefore, at the γ correction unit 124, the light-quantity correction table stored into the ROM 102 (refer to FIG. 14) is used to perform not only the γ correction but also another correction depending on change in output light quantity L.

For example, if an output light quantity is 100%, a part which reflects reflected light input on the basis of E=255 is the brightest in principle. If light at an output light quantity of 40% is emitted at this part, the reflected light is also decreased to 40% in light quantity and an input value of E=255×0.4=102 is maximized. More specifically, an input value E when the output light quantity is 40% will be 40% of an input value E when the output light quantity is 100%. Therefore, an output value D when the output light quantity is 40% will also be 40% of an output value D when the output light quantity is 100%. In order to accurately reproduce the actual contrast of images of a document, an output value D is multiplied by 2.5 times at the gamma correction unit 124 to perform a correction.

As described above, in performing the γ correction and another correction depending on change in output light quantity, a relational expression between the output value D and the correction value R' is expressed by the function of Formula 2 (one example of a correction value calculating unit) when the output value D is an 8-bit signal (256 stage), a value is 2.0, and the output light quantity is L (%)

$$R=100/L \times (D/255)^{1/\alpha} \times 255 \qquad \text{[Formula 2]}$$

Incidentally, if an output light quantity is maximum or 100%, the contrast of images of a document can be expressed in 256 stages on the basis of 8 bits. However, if the output light quantity is less than 100%, it is not expressed in 256 stages. For example, if the output light quantity is 40%, the contrast of images is expressed in 103 stages. Thus, the smaller the output light quantity on reading images of the document, the rougher the images when they are printed.

Further, the function of Formula 2 is expressed by a simplified formula for describing a technical idea of the present invention. Functions corresponding to characteristics of an actually used cold-cathode tube 2 and a CCD image sensor 85 or their inverse functions may be used. Still further, characteristics of a standard cold-cathode tube 82 and the CCD sensor 85 are determined to obtain their approximate functions, which may be subsequently used.

A motor driver 109 is to drive a DC motor 31 of a belt driving mechanism 30. The motor driver 109 receives an output signal from the CPU 101 to generate an electric signal for rotating the DC motor 31. When the DC motor 31 which has received the electric signal is rotated, the rotating force is transmitted via pulleys 32, 33 and an endless belt 34 to a pulley 26 of a CCD unit 18. Thereby, the CCD unit 18 is moved.

A panel gate array (panel GA) 110 functions as an interface for accepting inputs from various types of operation keys 13 such as a start button and a stop button disposed on the operation panel 4 of the document reading device 3 and also controls the operation keys 13. The panel gate array 110 detects that the operation keys 13 have been depressed, thereby a predetermined code signal is outputted. A key code is allocated to each of these operation keys 13. When the CPU 101 receives a code signal indicating a predetermined key code outputted from the panel gate array 110, it carries out an appropriate control processing in accordance with a predetermined key processing table. This key processing table is a table prepared by allowing the key code to correspond to the control processing and stored in the ROM 102, for example.

The liquid crystal display controller 111 is connected to a liquid crystal display 14. The liquid crystal display controller 111 controls the screen display of the liquid crystal display 14. The liquid crystal display controller 111 enables the liquid crystal display 14 to display on the screen action information on the document reading device 3, setting information, error information and guide information based on instructions from the CPU 101.

The lighting time counter 105 is a clock device for starting to count time on receipt of instructions outputted from the CPU 101. The lighting time counter 105 is used to clock an elapsed time from start-up of a light source of the cold-cathode tube 82. The time clocked by the lighting time counter 105 is stored in an inner memory of the lighting time counter 105. The CPU 101 compares a set value of a timer stored in a resistor with the time inside the inner memory and judges whether or not a predetermined time has elapsed. Incidentally, if a reset signal is outputted from the CPU 101 to the lighting time counter 105, the inner memory of the lighting time counter 105 is initialized (reset).

The driving circuit 112 is a power circuit for supplying driving voltage to the cold-cathode tube 82 according to a signal level of control signals outputted from the CPU 101.

(Draft Copy Setting Processing)

Figure 15:
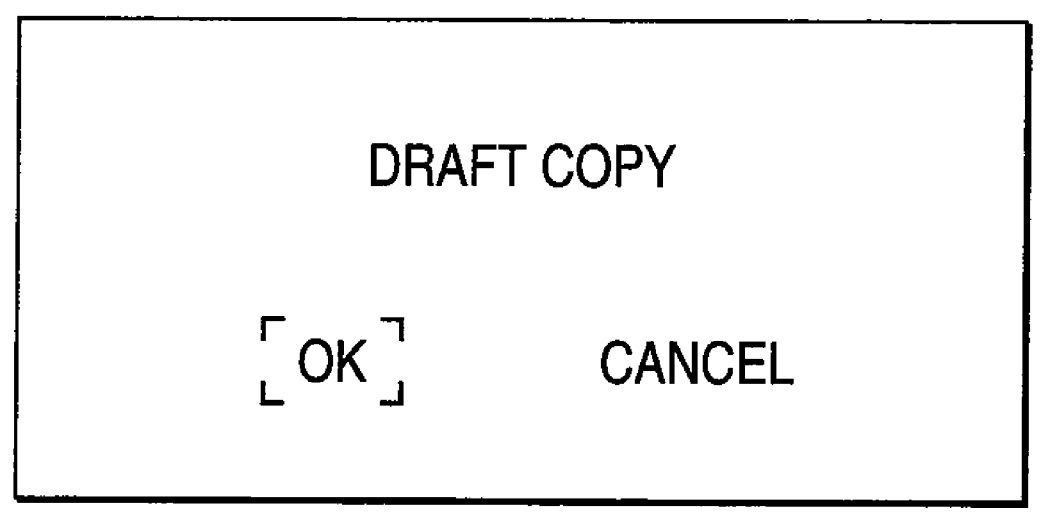

A description will be made for draft copy setting processing by referring to FIG. 15. FIG. 15 is a drawing showing a display screen of the liquid crystal display 14 for setting a draft copy.

As described above, if an output light quantity is maximum or 100%, the contrast of images of a document can be expressed in 256 stages on the basis of 8 bits. However, if the output light quantity is less than 100%, it cannot be expressed in 256 stages. Thus, the smaller the output light quantity of the cold-cathode tube 82 on reading images of the document, the rougher the images when they are printed. In other words, the shorter the elapsed time (lighting time) t from start-up of a light source of the cold-cathode tube 82, the rougher is an image quality which is initially read when the main power supply of the multi-function device 1 is switched on.

In view of this, OK/CANCEL can be displayed on the liquid crystal display 14 of the multi-function device 1 as shown in FIG. 15 in order to obtain an approval from users for reading a document in an output light quantity which is unable to guarantee a high image quality when the main power supply is switched on to copy (reading action). If the draft copy is set by using operation keys 13, the time for draft copy (lighting time) t can be further shortened for users who may accept the read images which are not guaranteed for a high image quality.

(Reading Processing)

Figure 16:
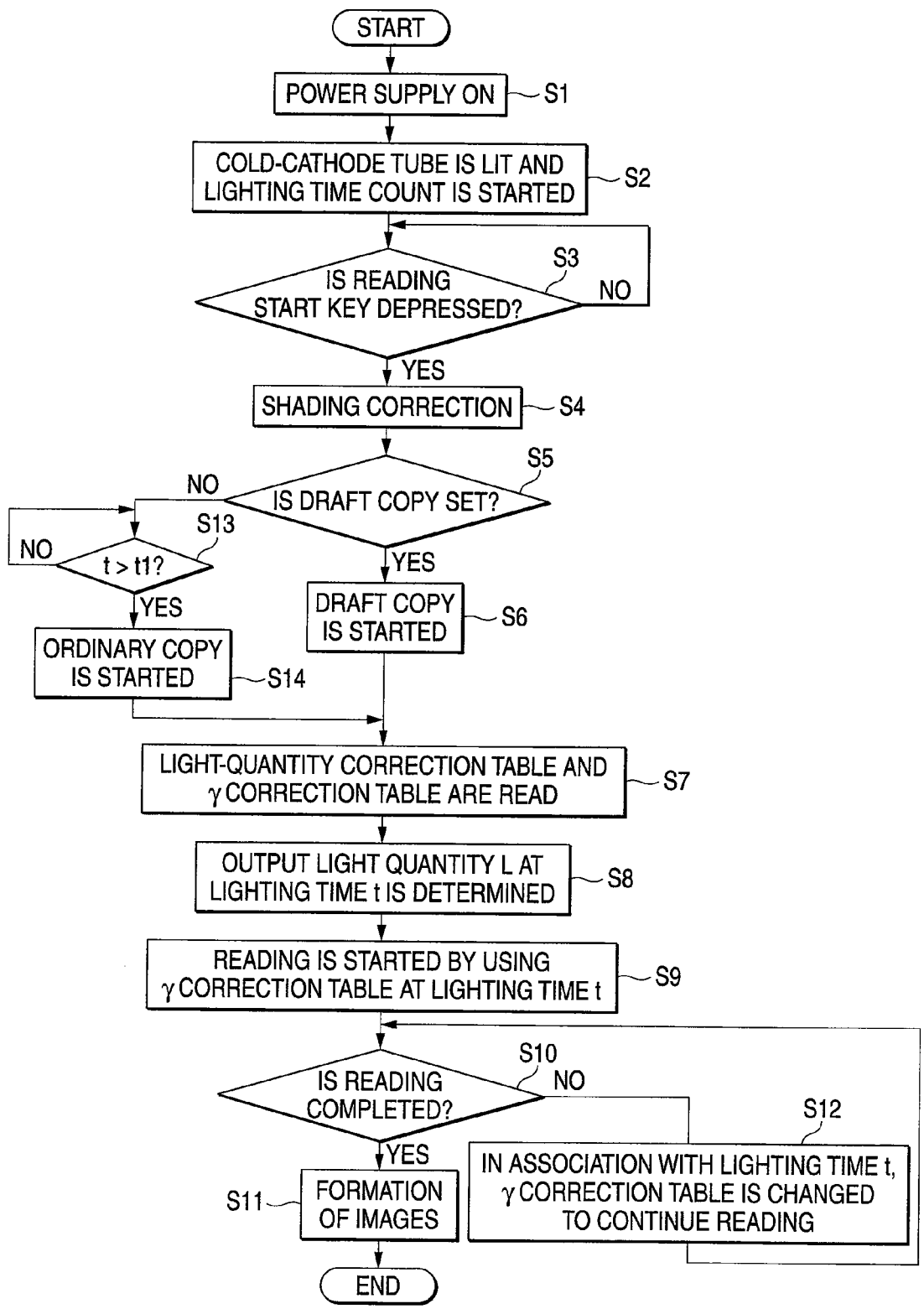

Then, with reference to FIG. 16, a description will be made for reading processing of a document by the multi-function device 1 immediately after the power supply is switched on. FIG. 16 is a flow chart showing the reading processing for reading the document placed on the platen glass 11 by using the multi-function device 1 immediately after the power supply is switched on.

First, when the main power supply of the multi-function device 1 is switched on (S1), the cold-cathode tube 82 is lit and the lighting time counter 105 starts to count (S2). After the lighting time counter 105 starts to count, judgment is made as to whether or not a user has depressed a reading start key (operation key 13) (S3). When it is judged that the reading start key has been depressed (S3:Yes), the CCD unit 18 reads a white reference plate 71, and a shading correction unit 123 of the image processing unit 108 performs shading correction (S4). After the shading correction, judgment is made as to whether or not a draft copy has been set (refer to FIG. 15) (S5). When it is judged that the draft copy has been set (S5: Yes), actions by the draft copy are started (S6) to read out a light-quantity correction table (refer to FIG. 14) and a γ correction table (refer to FIG. 11) stored into the ROM 102 (S7). At the γ correction unit 124, an output light quantity L (%) which has elapsed by t from the start of lighting of the cold-cathode tube 82 is determined on the basis of a counter value t of the lighting time counter 105 and the read-out light-quantity correction table (S8). When the output light quantity L is determined, at the γ correction unit 124, the read-out γ correction table is converted on the basis of the determined output light quantity L and Formula 2, and the converted γ correction table is used to start reading a document to perform the γ correction (S9). After completion of reading the document by the CCD unit 18 (S10:Yes), image data subjected to various types of image processing is sent by the CPU 101 to the RAM 103 and temporarily stored in the RAM 103. Then, the image data stored in the RAM 103 is sent out to the control unit 200 and images are formed on a sheet P by the image forming unit 22 (S11), and this processing is completed. If the document is not completed for reading (S10: No), the γ correction table is changed in association with the elapsed time t after the start of lighting of the cold-cathode tube 82 until the reading is completed. The changed γ correction table is used to continue reading of the document (S12).

On the other hand, if it is judged that the draft copy has not been set and an ordinary copy (reading) is carried out in a light quantity of the cold-cathode tube 82 which is at a certain level (S5: No), judgment is made as to whether or not a counter value t of the lighting time counter 105 is greater than t1 (standby time) (S13). After the start of lighting of the cold-cathode tube 82, actions by the ordinary copy are kept in standby until the elapse of time t1 (S13: No). If it is judged that a counter value t of the lighting time counter 105 is greater than the t1 (S13: Yes), actions by the ordinary copy are started (S14), and reading of a document in association with the γ correction subsequent to S7 is performed.

As described above, the reading processing according to this aspect will provide the following effects.

(1) It is possible to shorten the time to create a draft copy without deterioration in the quality of the read images even immediately after the main power supply of the multi-function device 1 is switched on in a state that the cold-cathode tube 82 is not sufficiently started up and there is a change in output light quantity to fail in reaching a maximum light quantity.

(2) It is possible to make an accurate correction on the basis of the light-quantity correction table and the γ correction table stored into the ROM 102 and also to shorten the time to start emitting light to a document by a light emitting-unit without deterioration in the quality of the read images.

(3) It is possible to convert a correction value D of the γ correction table stored into the ROM 102 at a maximum light quantity (100%) by referring to the function of Formula 2 and therefore to reduce an area used by the ROM 102.

(4) Since a draft copy can be set, it is possible to obtain an approval from users for reading documents in an output light quantity which is unable to guarantee a high image quality when the main power supply is switched on to copy (reading action).

(Other Aspects)

Aspects of the present invention are not restricted in the aforementioned aspect in any respect but may be modified or improved in various forms within a scope of the invention.

In the aforementioned aspect, a γ correction table is prepared when an output light quantity is L on the basis of the γ correction table and Formula 2 when the output light quantity is 100%. However, a plurality of γ correction tables which correspond by every 1% of the output light quantity, for example, may be stored into the ROM 102 in advance.

In the aforementioned aspect, after the power supply of the multi-function device 1 is switched on, a light source of the cold-cathode tube 82 is to be switched on. However, the light source of the cold-cathode tube 82 may be switched on by detecting whether a document is set by referring to the opening or closing of the document cover 5 or by detecting whether the document is set on the document tray 37 by the document sensor 98 to confirm that the document is set.

Further, in the aforementioned aspect, the γ correction unit 124 is provided for correcting a deviation of the contrast of images of a document due to characteristics (such as design value) of various constituents making up the CCD image sensor 85 from the contrast of images formed by reading the images of the document or reading of the document by the cold-cathode tube 82 which is not at a maximum output light quantity. Additionally, correction may be made by also taking a change in temperature in the vicinity of the multi-function device 1 into account.

For example, on the assumption that a temperature range around a place where the multi-function device 1 is used is from 1° C. to 40° C., a correction table is changed every time when the temperature changes by one degree. Then, as shown in FIG. 14, 40 γ correction tables are stored in the ROM 102. When the table at S7 as shown in the flowchart of FIG. 16 is read out, one γ correction table may be read out from 40 of them on the basis of temperatures determined by a temperature detector (not shown).

As described above, when any deviation resulting from a change in temperature is also taken into account, it is possible to make a more accurate correction without deterioration in the quality of the read images.

Still further, in the aforementioned aspect, documents are placed on the platen glass 11 and read at the reading processing for a first copy. The present invention is also applicable to the first copy where the ADF 6 is used to automatically send the documents.

Still further, in the aforementioned aspect, a correction has been made by using the light-quantity correction table and the γ correction table stored into the ROM 102 as well as the function of Formula 2. However, the correction may be made by using only the function L(t) to determine a light quantity L based on an elapsed time t (one example of a light-quantity calculating unit) and the function such as Formula 3 to determine a correction value R' based on an output value D (one example of a correction value calculating unit).

$$R' = 100/L(t) \times (D/255)^{1/\alpha} \times 255 \quad \text{[Formula 3]}$$

In the above-described correction processing, a step in which a correction value R' calculated by substituting an elapsed time (lighting time) t counted by the lighting time counter 105 and an output value D outputted from the CCD unit 18 to the image processing unit 108 for the function of Formula 3 is used to conduct reading actions is carried out in place of steps of S7 to S9 or S12 shown in FIG. 16.

Since there is no need to store the light-quantity correction table or the γ correction table into the ROM 102, an area used by the ROM 102 can be reduced.

The function of Formula 3 is also expressed by a simplified formula for describing a technical idea of the present invention. Functions corresponding to characteristics of an actually-used cold-cathode tube 2 and a CCD image sensor 85 and their inverse functions may be used. Further, characteristics of a standard cold-cathode tube 82 and the CCD sensor 85 are measured to obtain their approximate functions, which may be used subsequently.

Still further, if the draft copy is not set, the time to start an ordinary copy at which a reading action is carried out at a certain light quantity from the start to count by the lighting time counter 105 (standby time) t1 may be set (refer to FIG. 16). For example, as shown in FIG. 17, an image quality at an ordinary copy in a minimum output light quantity (minimally guaranteed image quality) and a standby time t1 which corresponds to the image quality are visually displayed in four stages on the liquid crystal display 14. The standby time t1 correspond to the image quality display may also be displayed. The user can select any display by using operation keys 13, etc. Thus, if the standby time t1 is set longer, it is possible to guarantee an ordinary reading action at a high quality, whereas if the standby time is set shorter, it is possible to shorten the time to start the ordinary reading action.

Still further, the aforementioned aspect is applied when a first copy is carried out. However, it is also applicable to functions for fax, scan and e-mail in which actions are conducted for reading images of a document.

What is claimed is:

1. An image reading apparatus comprising:
a light emitting unit which emits light to a document;
a photoelectric conversion unit which converts a quantity of light reflected from the document into an analog signal;
an A/D converter which converts the analog signal to a digital signal;
a clock unit which clocks an elapsed time from start-up of the light emitting unit which occurs upon a power supply being switched on;
a memory including:
a light-quantity correction table in which the elapsed time is corresponded to the quantity of light; and
a γ correction table in which a digital signal is corresponded to a first correction value for carrying out γ correction for the digital signal; a light-quantity calculating unit which calculates the quantity of light emitted to the document from the light emitting unit on the basis of the clocked elapsed time from a time at which the clock unit starts clocking to a time at which the light emitting unit starts emitting the light by an operation of a user by referring to the light-quantity correction table;
a correction value calculating unit which calculates a second correction value for the digital signal on the basis of the quantity of light calculated by the light-quantity calculating unit and the digital signal; and
a γ correction unit which corrects the digital signal on basis of the γ correction table,
wherein the γ correction unit is configured to:
convert the γ correction table on the basis of the second correction value calculated by the correction value calculating unit; and
correct the digital signal on the basis of the converted γ correction table.

2. The image reading apparatus according to claim 1 wherein the γ correction table varies depending on a temperature.

3. The image reading apparatus according to claim 1, wherein the correction value calculating unit includes a function which determines the second correction value by referring to the quantity of light and the digital signal, and
wherein the correction value calculating unit converts the first correction value of the γ correction table by referring to the function.

4. The image reading apparatus according to claim 1, further comprising an activation time reading setting unit which sets an activation time reading action which starts to emit light to a document before the elapsed time reaches an ordinary standby time.

5. The image reading apparatus according to claim 4, further comprising a standby time setting unit for setting the ordinary standby time.

6. An image forming apparatus comprising:
a light emitting unit which emits light to a document;
a photoelectric conversion unit which converts a quantity of light reflected from the document into an analog signal;
an A/D converter which converts the analog signal into a digital signal;
a clock unit which clocks an elapsed time from start-up of the light emitting unit which occurs upon a power supply being switched on;
a memory including:
a light-quantity correction table in which the elapsed time is corresponded to the quantity of light; and
a γ correction table in which a digital signal is corresponded to a first correction value for carrying out γ correction for the digital signal,
a light-quantity calculating unit which calculates the quantity of light emitted to the document from the light emitting unit on the basis of the clocked elapsed time from a time at which the clock unit starts clocking to a time at which the light emitting unit starts emitting the light by an operation of a user by referring to the light-quantity correction table;
a correction value calculating unit which calculates a second correction value for the digital signal on the basis of the light quantity calculated by the light-quantity calculating unit and the digital signal;
a γ correction unit which corrects the digital signal on the basis of the γ correction table, wherein the γ correction unit is configured to:
convert the γ correction table on the basis of the second correction value calculated by the correction value calculating unit; and
correct the digital signal on the basis of the converted γ correction table; and
an image forming unit which forms an image on the basis of the corrected digital signal.

* * * * *